United States Patent [19]

Hashimoto

[11] 4,058,679
[45] *Nov. 15, 1977

[54] TELEPHONE ANSWERING DEVICE WITHOUT OUTGOING MESSAGE TAPE

[75] Inventor: Kazuo Hashimoto, Tokyo, Japan

[73] Assignee: Hashimoto Koporeishon Kabushiki Kaisah, Japan

[*] Notice: The portion of the term of this patent subsequent to Oct. 5, 1993, has been disclaimed.

[21] Appl. No.: 681,526

[22] Filed: Apr. 29, 1976

Related U.S. Application Data

[63] Continuation-in-part of Ser. No. 527,864, Nov. 27, 1974, Pat. No. 3,984,640.

[30] Foreign Application Priority Data

Jan. 31, 1974  Japan .................................. 49-13174

[51] Int. Cl.$^2$ ............................................. H04M 1/64
[52] U.S. Cl. ................................................. 179/6 R
[58] Field of Search ................... 176/6 R, 6 E, 6 AC, 176/100.10 R

[56] References Cited

U.S. PATENT DOCUMENTS

| 2,528,459 | 10/1950 | Thompson | 179/6 R |
| 3,064,085 | 11/1962 | Muramatsu | 179/6 R |
| 3,535,464 | 10/1970 | Deinzer | 179/100.1 R |
| 3,549,821 | 12/1970 | Langendorf | 179/100.1 R |
| 3,794,767 | 2/1974 | Todd | 179/6 R |
| 3,984,640 | 10/1976 | Hashimoto | 179/6 R |

Primary Examiner—Bernard Konick
Assistant Examiner—Alan Faber

[57] ABSTRACT

A telephone answering device comprises an oscillator circuit for first producing a peculiar signal such as a small Morse code "K" twittering to notify a caller that he is calling a telephone answering device and thereafter intermittently producing "beep" tone signal to notify him that he can continue to send his message, the production of these signals being controlled by the combination of a multi-vibrator circuit and a buffer circuit connected between the oscillator circuit and the multi-vibrator circuit, thereby eliminating an outgoing message tape of a conventional telephone answering device.

11 Claims, 6 Drawing Figures

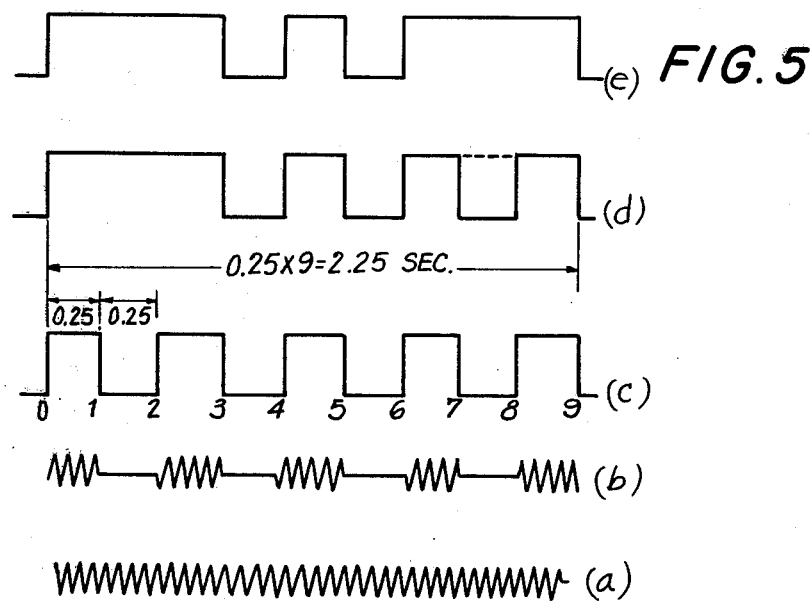

TELEPHONE ANSWERING DEVICE WITHOUT OUTGOING MESSAGE TAPE

BACKGROUND OF THE INVENTION

This is a continuation-in-part of the parent Application Ser. No. 527,864, filed Nov. 27, 1974, now U.S. Pat. No. 3,984,640.

This invention relates to telephone answering and recording devices (hereinafter referred to as telephone answering devices), and more particularly to a device.

In conventional telephone answering devices, an endless outgoing tape in which answering terms such as a telephone number and a subscriber's name have been recorded in advance is driven in response to a calling signal so that the answering terms are transmitted to a caller, and the caller's message is recorded in a different tape, that is, an incoming message recording tape.

With respect to the answering terms, there are provided strict telephone regulations in some countries. That is, the name of a subscriber, or a receiver, having a telephone answering device, a telephone number, notification of recording and so forth must be recorded in the endless tape in advance. However, when a traveler uses such a telephone answering device at the destination of his travel, it is not always necessary to transmit the answering terms to callers. In other words, if the device is so designed that upon reception of a calling signal, a peculiar signal such as a Morse code "K" instead of the answering terms is transmitted to the caller, he will understood that he is calling a telephone answering device and start sending his message over the phone. Thus, the object of the telephone answering device can be achieved satisfactorily.

Popular cassette tape recorders or extremely small tape recorders are convenient for a traveler in recording messages at his staying place on a journey. Accordingly, the device according to this invention, which will be described later in detail, is connected to the tape recorder mentioned above with particular patch cords thereby to be ready for recording messages. Upon reception of a calling signal, the telephone lines form a loop circuit and the peculiar signal is transmitted to the caller. Thereafter, during a predetermined time period, signals are transmitted to let him know that he can continue to send his message.

When the predetermined time period is over, the loop circuit of the telephone lines is opened so that the device waits for the next calling signal. If the device is so designed that the operations thereof are carried out as briefly described above, the object of the telephone answering device can be achieved.

In addition, this invention relates to improvement of the devices of Japanese Patent Application No. 10875/71 and Japanese Patent Application No. 23006/72 laid open on Oct. 11, 1972. In the Japanese Patent Application No. 10875/71, three relays are employed, but in the present invention only one relay is employed for obtaining the same functions. Furthermore, the present invention is more advantageous in that it is simpler in construction, stabler in operation even if a voltage applied thereto is reduced due to the consumption of the voltage source, or batteries, smaller in size so as to be convenient in carrying it with the user, smaller in power consumption, and more practical as a portable device for recording incoming messages over telephone.

SUMMARY OF THE INVENTION

Accordingly, a first object of this invention is to provide a telephone answering device in which a peculiar signal, for instance, a Morse code "K" which means "Go ahead" or "Transmit your message" is produced in order to eliminate an outgoing tape in which answering terms have been recorded.

A second object of the invention is to provide a telephone answering device in which a peculiar signal such as a Morse code "K" is produced for several seconds after a loop circuit of telephone lines has been formed upon reception of a calling signal and thereafter "beep" tone signals are intermittently produced during a predetermined period of time so as to let a caller record his message.

A third object of the invention is to provide a telephone answering device in which a peculiar signal such as Morse code "K" of a small bird is produced so that a caller listens to this signal for a while, without hanging up his receiver by mistaking it for a warning signal or other signals from a telephone central office.

A fourth object of the invention is to provide a telephone answering device in which the top part of a peculiar signal such as a Morse code "K" requesting that a caller starts sending his message is delivered, as a "beep" tone signal, to telephone lines by controlling a peculiar-signal generating circuit so that the circuit is operated intermittently (once in 7 or 8 seconds) for a short time (less than 0.5 second) by an astable multivibrator circuit.

A fifth object of the invention is to provide a telephone answering device the main body of which is connected to an incoming message recorder through the microphone jack of an ordinary cassette tape recorder, or a jack assembly consisting of small and large jacks, thereby to control the recorder.

A sixth object of the invention is to provide a telephone answering device, in which operating switches each having three positions, "automatic recording", "stop" and "manual recording" are provided, and when the switches are set at their "manual recording" positions, the recording of the mutual conversation can be continued for a relatively long period of time and a peculiar signal notifying a caller that his message will be recorded in an incoming message recorder is not produced, but the intervals between "beep" tones are lengthened twice, that is, the "beep" tone occurs once in 15 seconds.

A seventh object of the invention is to provide a telephone answering device in which a pilot lamp is connected in series to a relay to keep longer the service life of a power supply, or batteries, and to indicate the engaging of telephone lines and also the consumption of the batteries.

The manner in which the foregoing objects and other objects have been achieved by this invention will become more apparent from the following detailed description and the appended claims when read in conjunction with the accompanying drawings.

BRIEF DESCRIPTION OF THE DRAWINGS

In the accompanying drawings:

FIG. 5 is a diagram illustrating various waveforms for description of the circuit shown in FIG. 4; and FIg. 6 is a truth table of a decimal counter shown in FIG. 4.

DETAILED DESCRIPTION OF THE INVENTION

Figure 1:
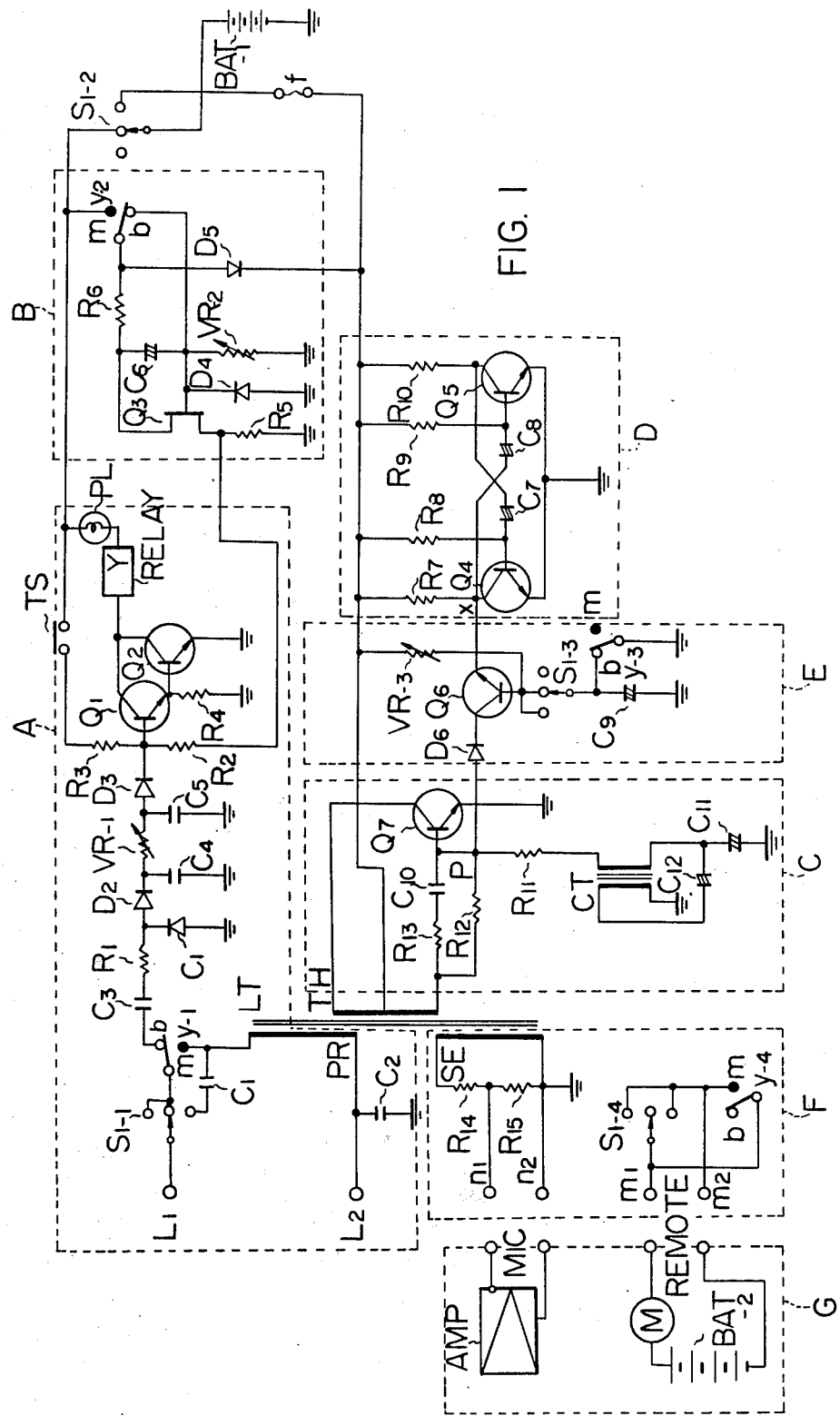
FIG. 1 is an electrical circuit diagram of a telephone answering device according to this invention.

One example of a telephone answering device according to this invention will be described with reference to FIG. 1 illustrating a circuit thereof.

As is apparent from FIG. 1, the device comprises telephone lines $L_1$ and $L_2$, resistors $R_1$ through $R_{15}$, capacitors $C_1$ through $C_{12}$, transistors $Q_1$ through $Q_7$, the transistor $Q_3$ being a field effect transistor, a lone transformer LT with a primary winding PR, a secondary winding SE and a tertiary winding TH, an oscillating transformer OT, power sources, or batteries BAT-1 and BAT-1, and slide type switches or rotary type switches $S_{1-1}$, $S_{1-2}$, $S_{1-3}$, and $S_{1-4}$ which are operated simultaneously. Each of the switches has three positions: "stop", "automatic recording" and "manual recording" or right, center and left which will become apparent later.

The device further comprises: diodes $D_1$ through $D_6$, variable resistors $VR_1$, $VR_2$ and $VR_3$, a fuse $f$, a relay Y having contact elements $y$-1, $y$-2, $y$-3 and $y$-4 each being in "break" position when the relay is not energized, a push button type test switch TS which is operated when the operating switches are set in the "automatic recording" position, and a pilot lamp PL connected in series to the relay Y. This pilot lamp PL has a filament which is low in its initial resistance, but the filament resistance is increased after it has been turned on by the operation of the relay Y, thereby to suppress the current flowing in the relay, that is, to reduce the current to the holding current of the relay. In this operation, it is natural that the excessive consumption of the battery causes to gradually reduce the brightness of the pilot lamp PL.

The device can be divided into blocks or section A, B, C, D, E and F in view of the functions thereof as indicated by dotted lines in FIG. 1.

The section A comprises the transistors $Q_1$ and $Q_2$ and the relay Y, and upon reception of a calling signal, operates the relay to form a loop circuit of the telephone lines.

The section B is a timer circuit having the field effect transistor $Q_3$. This timer circuit B operates to maintain the self-holding condition of the relay Y which has been energized, and to open the self-holding circuit in a period of time which is predetermined by the variable resistor VR-2, or in approximately 60 seconds, and to open the telephone lines thereby to allow the whole device to be ready for the next calling.

The section D is an astable multi-vibrator circuit comprising the transistors $Q_4$ and $Q_5$. When the operating switches are set at the "automatic recording" position, the transistor $Q_4$ is rendered non-conductive, or off, for very short period of time (less than 0.5 second) once in about seven second, thereby to form "beep" tone signals described later.

The section C is a special oscillator circuit comprising the transistor $Q_7$ and the oscillating transformer OT to produce a special signal like a Morse code "K", that is indicated by a dash-dot-dash. If a simple signal is produced, a caller may mistake it for a warning signal for instance and hang up the receiver. In order to overcome this trouble, the special oscillator circuit C is provided. In other words, if the sound like the Morse code "K" is generated, he will listen to it to find out what it is for a while, and finally he will hear the "beep" tone and know that his message can be recorded.

The section F is a control circuit for controlling an incoming message recorder G provided externally. Terminals $m_1$ and $m_2$ of this circuit F are connected to an electric motor circuit of the recorder G, the motor circuit being completed by the contact $y$-4 of the relay y, while other terminals $n_1$ and $n_2$ serve to deliver the signal from the secondary winding SE of the line transformer to the amplifier AMP in the recorder G.

The section E is a buffer circuit or gate circuit located between the sections C and D for controlling the function of the above-described oscillator.

Hereinafter, for convenience in description, the assembly of the sections A, B, C, D, E and F will be referred to as "a main body", and the assembly plus the incoming message recorder G as "the device according to this invention" when applicable. However, it should be noted that the recorder G may be incorporated in the main nody or may be separable from the same.

The operation of the device will now be described. In this connection, it is assumed that the operating switches are set at the "automatic recording" position.

When a signal of 16 cycles is applied through the line $L_1$ and $L_2$ to the device, the signal flows through the break contact of the contact element $y$-1 of the relay Y, the capacitor $C_3$ and the resistor $R_1$ and is rectified by the diodes $D_1$ and $D_2$. The signal thus rectified goes through the variable resistor VR-1 whereby electrical charges are stored in the capacitor $C_5$. When the charges are stored to a certain value, a positive voltage is applied through the diode $D_3$ to the base of the transistor $Q_1$, as a result of which the transistor $Q_1$ is rendered conductive and a voltage drop is therefore caused by the emitter resistor $R_4$. This voltage is applied to the base of the transistor $Q_2$ to render the latter $Q_2$ conductive also, which leads to the energization of the relay Y.

Upon energization of the relay Y, the pilot lamp PL is turned on while the contacts elements $y$-1 through $y$-4 are set in "make" position, that is, the armatures thereof are thrown to the make contacts $m$ from the break contact $b$. As a result, the contact element $y$-1 causes the lines $L_1$ and $L_2$ to form a loop circuit with the primary winding PR of the line transformer LT, while the contact element $y$-2 supplies electric current to the drain of the field effect transistor $Q_3$. In this operation, a voltage is applied through the capacitor $C_6$ to the gate electrode of the transistor $Q_3$ to render the latter $Q_3$ conductive, and the capacitor $C_6$ is charged gradually through the variable resistor VR-2. Upon completion of this charge, the transistor $Q_3$ is rendered non-conductive, or off. In this embodiment, the time constant is predetermined so that the period of time between the on and off operations of the transistor $Q_3$ is 60 seconds. When the armature of the contact elements $y$-2 was maintained at the break contact $b$ previously, the capacitor $C_6$ was shunted by the contact element $y$-2 and discharged completely. Therefore, the time constant has always a constant value whenever the armature of the contact element $y$-2 is thrown to the make contact $m$.

When the transistor $Q_3$ is rendered conductive as described above, a positive voltage is applied from the power source thereof through the resistor $R_2$ (about 33 k$\Omega$) to the base of the transistor $Q_1$ to render the latter $Q_1$ conductive. As a result, the self-holding circuit of the relay Y is formed. Thus, the relay Y is held for a certain period of time, whereby the loop circuit is continuously maintained, while an electrical current is supplied through the contact y-2 and the diode $D_5$ to the transistors $Q_4$, $Q_5$, $Q_6$ and $Q_7$.

The transistor $Q_7$ oscillates upon supply of the current thereto. The collector side and the base side of the transistor $Q_7$ are connected together through the tertiary winding TH of the line transformer. A network of the resistor $R_{13}$ (about 1k$\Omega$), the capacitor $C_{10}$ and the resistor $R_{12}$ is provided as the base circuit of the transistor $Q_7$. Furthermore, the oscillating transformer OT is connected through the resistor $R_{11}$ to the base of the transistor $Q_7$. The primary winding of the transformer OT is connected to the secondary winding of the same by the capacitor $C_{12}$ provided between terminals $g_1$ and $g_2$ of the transformer OT.

The oscillator circuit C described above is a typical one which is designed to produce the special oscillation sound like a Morse code "K" through the various experiments. The network and the oscillating transformer connection may be modified in various ways. However, if a precise code signal consisting of dots, dashes, and intra-symbol spaces should be employed, another circuit is disclosed in FIG. 4 for this purpose.

As was described above, when the armature of the contact element y-2 is thrown to the make contact m and the current is applied to the oscillator circuit C through the diode $D_5$, immediately the transistor $Q_7$ starts oscillation, and the oscillation sound is transmitted to the primary winding side, or the telephone line side, if the line transformer LT from the tertiary winding side TH. At the same time, the positive voltage is applied to the base of the transistor $Q_6$ through the variable resistor VR-3; however, the transistor $Q_6$ is maintained inoperative or cut-off because the capacitor $C_9$ (about 100$\mu$F) is grounded to bypass the positive voltage.

However, in about three seconds determined by the time constant of the variable resistor VR-3 and capacitor $C_9$, the capacitor $C_9$ is charged. As a result, the positive voltage is now applied to the base of the transistor $Q_6$, that is, the transistor $Q_6$ is rendered conductive for the first time. In other words, the oscillation sound is transmitted to the primary winding side PR of the line transformer LT for the first three seconds, but thereafter the oscillation output is grounded through the diode $D_6$, the collector and emitter of the transistor $Q_6$, and the collector and emitter of the transistor $Q_4$ (described later), that is, the oscillation is suspended.

The relationships in operation of the transistors $Q_4$ and $Q_5$ in the astable multi-vibrator circuit D will now be described. In this circuit, the capacitance of the capacitor $C_8$ is greater than that of the capacitor $C_7$. Accordingly, when the circuit is energized, the operation of the transistor $Q_5$ occurs later than that of the transistor $Q_4$, that is, first the transistor $Q_4$ is rendered conductive for a long time, and while the transistor $Q_5$ is rendered non-conductive for a short time, and next these states are reversed. For instance, the point x of the transistor $Q_4$ becomes "on" for seven seconds and then "off" for 0.2 second. This condition is repeated so long as the timer circuit B is active.

As was described above, this astable multi-vibrator circuit is so designed that it has a period of about seven seconds and repeats the "off" condition for a short time period once in seven seconds. Accordingly, first the oscillation is continued for about three seconds in the oscillator circuit C to transmit the oscillation output to the lines, and, thereafter, when the state of the transistor $Q_6$ is changed from its cut-off state to the conductive state, the oscillation output is grounded through the transistor $Q_6$ thus changed, whereby the oscillation is suspended. In about four seconds after this suspension, the transistor $Q_4$ is rendered non-conductive, or off.

Figure 2:
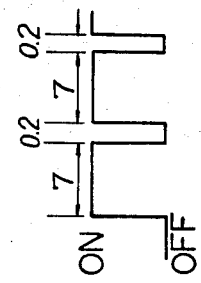
FIG. 2 is a graphical representation indicating a voltage wave-form at the point X in FIG. 1.

More specifically, the transistor $Q_4$ is first conductive and is then rendered non-conductive in about seven seconds. After this non-conductive condition of the transistor $Q_4$ has been maintained for about 0.2 second, it is rendered conductive again, as is indicated in FIG. 2. That is, the oscillation is effected for the first three seconds after the energization, and is then suspended for four (4=7−3) seconds, and thereafter the oscillation is effected for about 0.2 second. After this, the oscillation for about 0.2 second is repeated once in seven seconds.

The sound of the oscillation for the 0.2 second is delivered out in almost the same state as simple pulses because it is the first part of the Morse code "K". In this invention, this sound is utilized as the "beep" tone signal which has been employed in telephone conversation recording devices, to notify the caller that his message can be recorded.

Accordingly, a person familiar to the use of such a telephone answering device can see that he is calling over a telephone answering device and it is ready for recording his message even if he tries for the first time.

The caller's voice signal, or his message, is introduced through the secondary winding SE of the line transformer LT and the terminals $n_1$ and $n_2$ of a microphone MIC to the amplifier AMP in the section G where it is amplified and recorded in the tape. In this operation, the armature of the contact element y-4 of the relay Y is maintained at the make contact m and the operating switch $S_{1-4}$ is at the "automatic recording" position. Therefore the terminal $m_1$ is connected to the other terminal $m_2$. As a result, the tape driving motor M built in the incoming message recorder is operated.

The terminals $n_1$ and $n_2$, and $m_1$ and $m_2$ are ones corresponding to the receptacle of a microphone used in the ordinary cassette tape recorder and are controlled remotely by a switch provided on the microphone.

The occurrence of the "beep" tone is, in general, once in about 15 seconds. However, in this invention, the "beep" tone is produced once in seven seconds so that the caller may not feel uneasy in sending his message since the device is used during the period no one is home. Of course, it is readily achieved to change the interval from 7 seconds to 15 seconds by changing the resistances of the resistors $R_9$ and $R_{10}$.

In addition, the 0.2 second is determined by the time constant elements, or the resistor $R_7$ (100K$\mu$) and the capacitor $C_7$ (1$\mu$F). The values of these elements $R_8$ and $C_7$ can also be changed if necessary. The contact element y-3 of the relay Y operates to discharge the capacitor $C_9$ immediately when the relay Y is de-energized. Therefore even if, immediately after the completion of recording one caller's message, another calling is made, the transmission of peculiar signal for 3 seconds can be effectively obtained again because the capacitor $C_9$ has been completely discharged by the operation of the contact element y-8.

Thus, the caller completes recording his message in the incoming message recorder.

On the other hand, the charging of the capacitor $C_6$ in the timer circuit for the transistor $Q_3$ advances with time, as a result of which the transistor $Q_3$ is rendered non-conductive finally, that is, the circuit driving the transistor $Q_1$ through the resistor $R_2$ is opened. Accordingly, the transistor $Q_2$ can no longer hold the relay Y, that is, the relay Y is de-energized, and the pilot lamp PL is also turned off. Upon de-energization of the relay Y, all of the contact elements are restored, that is, the armatures of the contact elements are thrown to the break contacts $b$, and the device is now waiting for the next call. The operations described above are conducted for every call.

The case where the operating switches are set at the "manual recording" positions will now be described.

By setting the operating switch $S_{1-2}$ at the "manual recording" position, the calling signal circuit in the section A and the relay Y in the section B are made inoperative and the timer circuit in the section B is not supplied with electric current; however, only the multivibrator circuit D, the oscillator circuit C and the buffer circuit E are made operative.

At the same time, the transistor $Q_6$ and the capacitor $C_9$ are disconnected from each other by swtting the switch element $S_{1-3}$ at the "manual recording" position, while the power supply is connected to the transistor $Q_6$ by setting the switch element $S_{1-2}$ at the "manual recording" position as a result of which the transistor $Q_6$ is immediately rendered conductive, and accordingly the oscillation for about 3 seconds of the section C is suspended. In other words, the transistor $Q_6$ is conductive and in addition the transistor $Q_4$ is also conductive. As a result, the base, or the point P, of the transistor $Q_7$ is grounded, whereby the answer signal like a bird's twittering for the initial three seconds is not produced. Thereafter, the transistors $Q_4$ and $Q_5$ change their on-off states every seven seconds. Since the transistor $Q_4$ becomes non-conductive for 0.2 second in 7 seconds thereby causing the point P to be disconnected from the ground, as a result of which only the "beep" tone is transmitted to the telephone lines for 0.2 second. Listening to this "beep" tone, a caller and a person called or an operator of the device can see that their conversation over the telephone is being recorded by the device, therefore, the violation of their privacy can be prevented.

Figure 3:
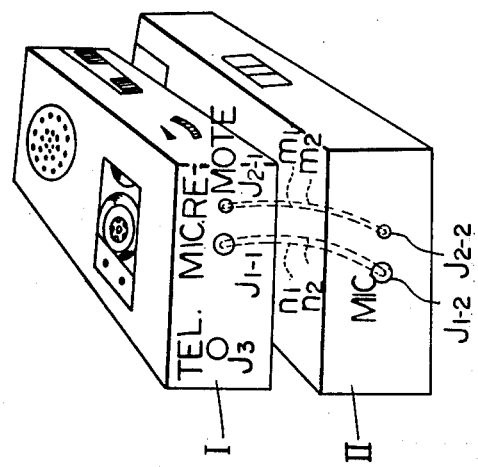
FIG. 3 is a perspective view of a main body of the device according to this invention and an incoming message recorder which are connected with patch cords.

FIG. 3 is a perspective view of the main body I and an extremely small tape recorder II which is approximately the same in size as the main body I. In general, such a tape recorder as operated by batteries has ordinarily a microphone jack $J_{1-2}$ and a remote control jack $J_{2-2}$ which are provided adjacent to each other as shown in FIG. 3. These jacks are connected to the microphone jack $J_{1-1}$ and the remote control jack $J_{2-1}$ with patch cords $n_1$ and $n_2$, and $m_1$ and $m_2$. Another jack $J_3$ is provided for connecting the main body to the telephone lines.

Now, the procedure which the operator should carry out with this device will be described.

Before he leaves his house for instance where is installed a telephone set equipped with the device, he sets the tape recorder or the incoming message recorder in recording state, but the tape recorder is not energized, because the above-mentioned patch cords are installed between the main body and the recorder. In other words, the recorder is energized only when the relay Y (FIG. 1) is energized. While his absence, messages will be recorded, if any, as described above. If, when he returns home, he sets the operating switches at the "stop" position, and removes the patch cords, the messages thus recorded can be reproduced by holding the small tape recorder in his hand. When a tape recorder is small in size, it is much easier to operate the tape recorder by holding it in hand. This is the reason why the cords are installed to be easily removed. In this connection, when the internal tape recorder is larger in size, longer patch cords are necessary. It is rather troublesome to connect these longer patch cords to the main body or disconnect them from the same. However, this can be overcome by setting the switches at the "stop" position, because if the switches are set at the "stop" position, the recorder can be operated without removal of the patch cords.

The oscillation circuit shown in FIG. 1 is relatively simple in construction. Therefore, it is difficult by the adjustment of the time constant of the oscillation circuit to produce a precise Morse code which is precise in arrangement or which, as in Morse code "K" or "dash-dot-dash", is accurate in the ratio in length of the dash and the dot, and also in the intra-symbol space.

Figure 4:
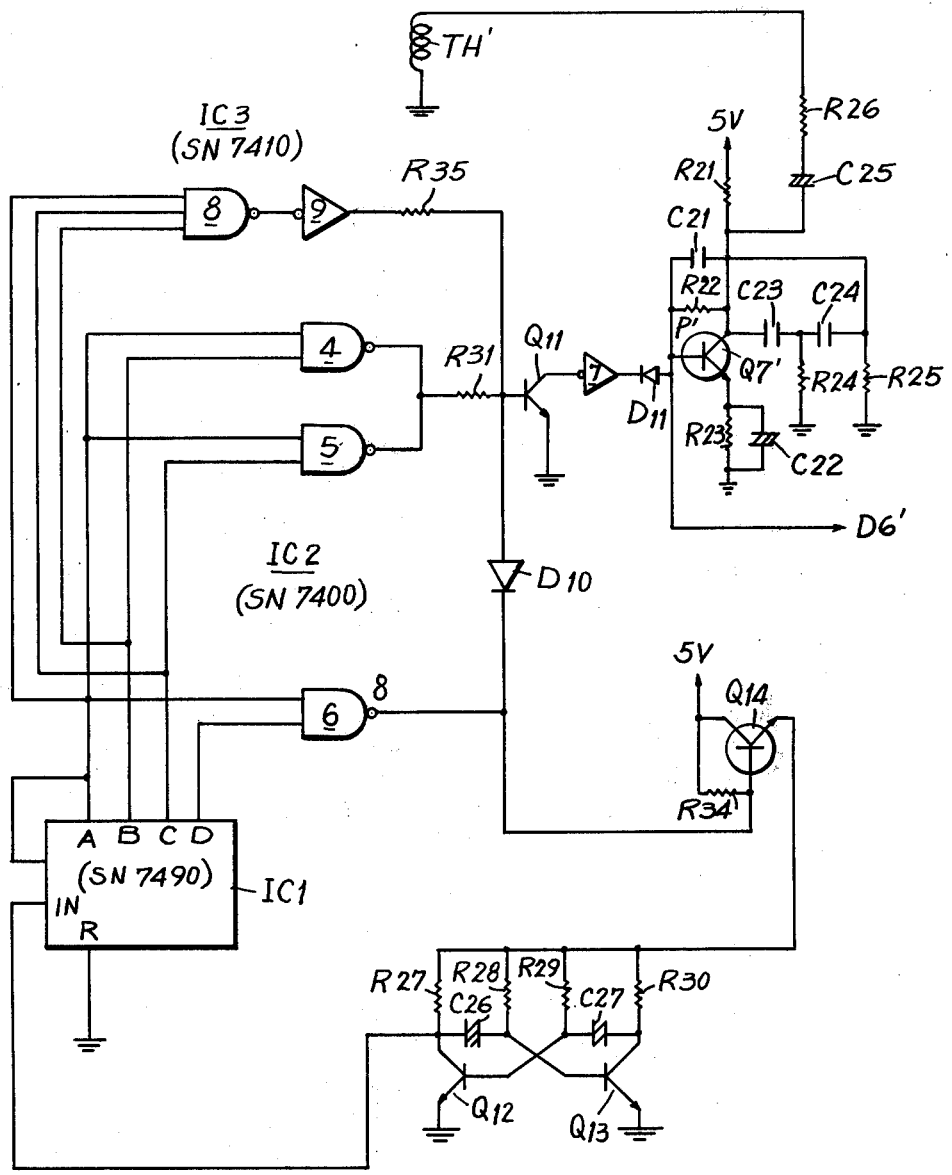
FIG. 4 is a circuit diagram for producing a Morse code "K"

FIG. 4 shows a circuit for producing the precise Morse code "K". The Morse code "K" is world-widely employed to mean "Go ahead or transmit your message" in radio communication and is therefore applicable to this invention.

In FIG. 4, a Morse code "K" producing circuit including a transistor Q7' is an audio frequency oscillating circuit. This circuit may be identical to the section C in FIG. 1, but is made simpler in construction than the latter. The Morse code "K" producing circuit shown in FIG. 4 further comprises a multi-vibrator circuit including transistors Q12 and Q13. The transistor Q7' is corresponding to the transistor Q7 in FIG. 1, and accordingly the base of the transistor Q7' is connected to a diode D6' through a circuit point p' corresponding point P of FIG. 1. The output of the audio frequency oscillating circuit is connected to a tertiary winding TH' corresponding to the tertiary winding TH of the line transformer LT in FIG. 1. A circuit (not shown in FIG. 4) connected to the diode D6' is identical to that connected to the diode D6 in FIG. 1.

The operating principle of the Morse code "K" producing circuit shown in FIG. 4 will be described. Similarly as in FIG. 1, upon energization of the transistor Q7' (and Q14), the transistor Q7' is rendered conductive by the action of the diode D6' because the transistor Q7' carries out its oscillation when the diode D6' is not grounded. In this connection, the low frequency oscillating circuit generates a continuous audio frequency such as shown in (a) of FIG. 5. If this continuous audio frequency generation were controlled by the multi-vibrator circuit only, a wave-form obtained by the oscillation of the transistor Q7' would be like a wave-form shown in (b) of FIG. 5. However, a desired signal representative of the Morse code "K (dash-dot-dash)" cannot be derived from the wave-form. In order to solve this problem, the multivibrator circuit is adapted to control several integrated circuits described later, and the outputs of these integrated circuits are employed to control the operation of the transistor Q7'. By this arrangement the desired signal or wave-form is obtained as will become apparent later.

Numerals 0, 1, 2, 3, 4, 5, 6, 7, 8, and 9 from left to right in (c) of FIG. 5 are intended to mean that the pulse width and interval are equal each being about 0.25 second, and that one operation is started at count number 0 and ended at count number 9 taking about 2.25 seconds.

As was described above, the transistors Q7' and Q14 are rendered conductive, and the multi-vibrator circuit is energized, so that the oscillation of the multi-vibrator circuit and also the low frequency oscillation of the transistor Q7' are initiated. In this operation, first the output of the multi-vibrator circuit is applied to an input IN of an integrated circuit $IC_1$. This integrated circuit $IC_1$ is a decimal counter formed with the SN7490 in which the relationships between the input count numbers and the corresponding binary codes of the output terminals A, B, C and D thereof are as indicated in a truth table (FIG. 6) well known in the art. Another integrated circuit $IC_2$ comprises two logic circuits having 2-input-NAND circuits 4, 5 and 6 and an inverter circuit 7. Another integrated circuit $IC_3$ comprises two logic circuits having a 3-input-NAND circuits 8 and an inverter circuit 9.

Thus, at count number 0, the integrated circuit $IC_1$ produces outputs "0" and "0" at the output terminals A and B, and therefore the output of the NAND circuit 4 is at a logic level "1", while the output of the NAND circuit 5, receiving outputs "0" and "0", is also at a logic level "1". These outputs are combined and applied to the base of a transistor Q11, as a result of which the transistor Q11 is rendered conductive. The output of the transistor Q11 is inverted by the inverter 7 so that a diode 11 connected to the inverter 7 is rendered nonconductive. Thus, the base of the transistor Q7' is not affected by the outputs of the NAND circuits 4 and 5, and the oscillation of the transistor Q7' starts.

At the count number 1, the NAND circuit 4 receives "1" and "0" from the terminals A and B of the integrated circuit $IC_1$ while the NAND circuit 5 receives also "1" and "0" from the terminal A and C of the same, as a result of which a logic level "1" is applied to the base of the transistor Q11. Accordingly, similarly as in the above case, the oscillation of the transistor Q7' is continued.

At the count number 2, outputs provided at the terminals A and B, and A and C are at "0" and "1", and at "0" and "0", respectively.

Therefore, a logic level "1" is applied to the base of the transistor Q11. Similarly as in the above two cases, the oscillation of the transistor Q7' is continued.

However, at the count number 3 the output of the NAND circuit 4 is at "0" by receiving "1" and "1" from the terminals A and B, while at the count number 5 the output of the NAND circuit 5 is also at "0" by receiving "1" and "1" from the terminal A and C. Accordingly, in both cases of the count numbers 3 and 5, a logic level "0" is applied to the base of the transistor Q11, as a result of which the transistor Q7' is rendered non-conductive and the oscillation thereof is suspended with the wave-form decaying as shown in (d) of FIG. 5.

At the count numbers 4 and 6, the inputs and the output of the NAND circuit 4 are at "0" and "0", and at "1", respectively, while the inputs and the output of the NAND circuit 5 are at "0" and "1", and at "1", respectively. Therefore in both cases, a logic level "1" is applied to the base of the transistor Q11 so as to render the latter conductive, as a result of which the oscillation of the transistor Q7' is effected again.

However, this oscillation is suspended at the succeeding count number or at the count number 7. More specifically, at the count number 7, the output of the NAND circuit 4 is at "0" by receiving "1" and "1", while the output of the NAND circuit 5 is also at "0" by receiving "1 " and "1". That is, a logic level "0" is applied to the base of the transistor Q11, and the oscillation of the transistor Q7' is suspended.

At the count number 8, each of the NAND circuits 4 and 5 receives "0" and "0" thereby producing an output "1". Therefore, the logic level "1" is applied to the base of the transistor Q11, and the oscillation of the transistor Q7' is effected, thereby providing a wave-form as shown in (d) of FIG. 5. However, a desired dash in the Morse code "K" cannot be derived from this wave-form.

In order to overcome this problem, an integrated circuit $IC_3$ formed with the SN7410 is employed as follows. At the count number 7, the integrated circuit $IC_3$ receives inputs at "1", "1" and "1" from the output terminals A, B and C of the integrated circuit $IC_1$, and produces an output "0". This output is inverted into "1" by the inverter 9 and is then applied to the base of the transistor Q11. As a result, the transistor Q7' is rendered conductive so as to continue its oscillation. That is, a decayed portion of the wave-form indicated by dots is compensated so that the oscillation is continued.

At the count number 9, outputs "1" and "1" from the output terminals A and D are applied to the NAND circuit 6 whereby the NAND circuit 6 produces an output "0". This output "0" is applied to the base of the transistor Q14 to render the latter nonconductive, as a result of which energization of the concerned sections is suspended. On the other hand, the output "0" of the NAND circuit 6 is applied also to the base of the transistor Q11 through a diode connected between the output of the NAND circuit 6 and the base of the transistor Q11, so as to render the transistor Q11 nonconductive. As a result, the transistor Q7' is rendered nonconductive thereby suspending its oscillation.

In the present invention, after the above-described oscillation is carried out for three seconds at the beginning, the oscillation is effected for about 0.2 second once per seven seconds. This can be achieved by connecting the diode D6' corresponding the diode D6 in FIG. 1 to the base of the transistor Q7. In other words, even if the transistor Q11 is maintained nonconductive, when the diode D6' is grounded the oscillation of the transistor Q7' is suspended, and when the grounding of the diode D6' is eliminated the oscillation of the transistor Q7' starts again. This operation is effected by the multi-vibrator in the second section D and the buffer circuit in the section E in FIG. 1, as was described before.

As was described above, in the device according to this invention, the loop circuit is formed in response to a telephone calling signal whereby the special answering signal like the Morse code "K" which means "Go ahead" or "Transmit your message" in radio communication, is transmitted to the caller for about three seconds and thereafter the first "beep" tone signal is transmitted to him in about four seconds. If he sees it from these signals that his message is to be recorded, and starts talking or sending his message, his message will be recorded in the external tape recorder which is designed so as to start its operation at the same time as the main body. In the predetermined period of time, the state of the device is restored.

During the operating period of the system, the "beep" tone signals are produced successively once in seven seconds so as to let him know that the device is in operation, that is, his message is being recorded. Accordingly, the provision of this device contributes to the simplification in construction of the conventional telephone answering device which necessitates two tapes: one is a tape in which the response terms have been recorded in advance, while the other is a tape in which a message is to be recorded. Furthermore, in the device according to this invention, electric current is scarcely consumed during the period when the device waits for calling signals, and even when the device is in operation, the holding current of the relay Y is adjusted to be extremely small by the filament of the pilot lamp PL after the energization of the relay Y. Accordingly, power consumption of the device is very small.

In addition, the simple buffer circuit or gate circuit is provided between the oscillator circuit and the multivibrator circuit, for properly controlling both the answering signal which is produced for the first three seconds after the start of the operation and the production of the "beep" tone signals which are delivered to the lines once in seven seconds after the production of the answering signal like the Morse code "K".

The device described above can be made smaller in size than portable transistor radio sets. Accordingly, it may be carried with the user when he goes on a journey for instance. Thus, the device according to this invention can remarkably improve the effects of the telephone answering device.

In this preferred embodiment of the invention, the relay Y is employed as a circuit element driven by the ringing circuit. However, recently a silicon controlled rectifier (SCR) is often employed as such a relay. In this case, a transistor type switching circuit is used in place of the relay. Various changes and modifications such as exemplified above may be made without departing from the invention, and all such changes and modifications fall within the true spirit and scope of the invention.

I claim:

1. A telephone answering device with means for controlling an incoming message recorder automatically in response to a calling signal, comprising ringing circuit means for energizing switching means in response to a calling signal; timer means energized through said ringing circuit means for starting the operation of said device and to deenergize the ringing circuit means after a predetermined period of time; a line transformer comprising a plurality of windings with a first winding connected through said switching means to telephone lines of the telephone answering device, a second winding for transmitting an oscillating signal to the telephone lines, and a third winding for introducing a caller's message to an external incoming message recorder; oscillator means with means for energizing said oscillator means through said switching means; said oscillator means being energized at the same time as said timer means to produce a predetermined answering signal; auxiliary switching means with means for setting auxiliary switching means to be off for a substantially short period of time at every preset time interval; and switching gate means connected between said oscillator means and said auxiliary switching means and having means for setting said auxiliary switching means a non-operative state for substantially a predetermined time interval after energization of the timer means, said auxiliary switching means being switched therafter to an operative state to control thereby the oscillation of said oscillator circuit.

2. A telephone answering device with means for controlling an incoming message recorder automatically in response to a calling signal, comprising ringing circuit means for energizing switching means in response to a calling signal; timer means energized through said ringing circuit means for starting the operation of said device and to deenergize the ringing circuit means after a predetermined period of time; a line transformer comprising a plurality of windings with a first winding connected through said switching means to telephone lines of the telephone answering device, a second winding for transmitting an oscillating signal to the telephone lines, and a third winding for introducing a caller's message to an external incoming message recorder; oscillator means with means for energizing said oscillator means through said switching means; said oscillator means being energized at the same time as said timer means to produce a predetermined answering signal; an astable multi-vibrator with means for setting said multi-vibrator to be off for a substantially short period of time at every preset time interval; and switching gate means connected between said oscillator means and said astable multi-vibrator and having means for setting said multivibrator non-conductive for substantially a predetermined time interval after energization of the timer means, said multivibrator becoming therafter conductive to control thereby the oscillation of said oscillator circuit.

3. A device as claimed in claim 2 wherein said predetermined answering signal comprises a Morse code "K" signal.

4. A device as claimed in claim 2, including a power source, said ringing circuit having a pilot lamp between said switching means and said power source, the filament of the pilot lamp being relatively low in its initial resistance and, when upon energization of said switching means the lamp is turned on and the resistance of the filament is increased, the electrical current through said switching means is limited to a minimum current value necessary and thereby minimizing electric power consumed in said switching means, said lamp indicating that the telephone lines are maintained closed.

5. A device as claimed in claim 2, wherein said oscillator means comprises semiconductor means, and feedback means of a transformer coupling and a C.R. coupling respectively between the collector and the base of the semi-conductor device and between the base and the emitter of said semiconductor means, the combination of the feedback means and the semiconductor means producing a predetermined tone signal for three seconds.

6. A device as claimed in claim 5 wherein said predetermined tone signal comprises a Morse code "K" signal.

7. A device as claimed in claim 5 wherein said predetermined tone signal comprises a Morse code signal.

8. A device as claimed in claim 2, wherein said astable multivibrator comprises first and second transistors with means for repeatedly turning on said multivibrator for substantially seven seconds and turning said multivibrator off for 0.2 second when said device is set to operate in absent condition, said multivibrator being turned on for substantially 15 seconds and off for 0.2 second by adjustment of values of a capacitor and a resistor thereof, and an operating switch for setting the device to operate under the condition that mutual telephone conversations are recorded in the incoming message recorder.

9. A device as claimed in claim 2, wherein said switching gate means comprises a transistor and integration means having an integration capacitor connected to the base of the transistor, the collector of the transistor being connected to the base of the semiconductor means in the oscillator means, the emitter of the transistor being connected to the collector of a first transistor of said astable multivibrator, said first transistor becoming conductive earlier than a second transistor of the astable multivibrator, the base of the first-mentioned transistor being grounded through the integration means, the firstmentioned transistor being not rendered conductive immediately after the energization of the switching gate means even if voltage is applied to the base thereof by the discharge of the integration capacitor, after charging the capacitor of the integration means in about three seconds from the energization, said first-mentioned transistor being rendered conductive thereby electrically connecting the astable multivibrator and said oscillator means, the operation of said oscillator means being controlled thereafter by on-off operation of the astable multi-vibrator.

10. A device as claimed in claim 2, including four operating switches each having three positions corresponding to "automatic recording", "stop" and "manual recording", the operating switches being set at the "automatic recording" position to carry out said operations of said device, and being set at the "manual recording" position to energize said oscillator means, said astable multi-vibrator and said switching gate means only without energizing said switching means and without delaying time by the switching gate means, whereby the operation of the oscillator is only controlled by said first transistor from beginning, said first transistor becoming non-conductive at every set time of the astable multi-vibrator, said operating switches being set at the "stop" position to de-energize said oscillator, multivibrator and switching gate means in such a manner that an incoming signal can go through said first and second windings to an amplifier of an external tape recorder, and an electric motor of an external tape recorder driven through an operating switch, the incoming signal being recorded free of beep-tones on the external tape recorder as long as the external tape recorder is in a recording mode.

11. A device as claimed in claim 2 wherein said predetermined answering signal comprises a Morse code signal.

* * * * *